(No Model.) 2 Sheets—Sheet 1.
H. B. LYNCH.
METHOD OF AND APPARATUS FOR PREPARING PIPE OR BAR FOR COATING WITH METAL.
No. 561,716. Patented June 9, 1896.
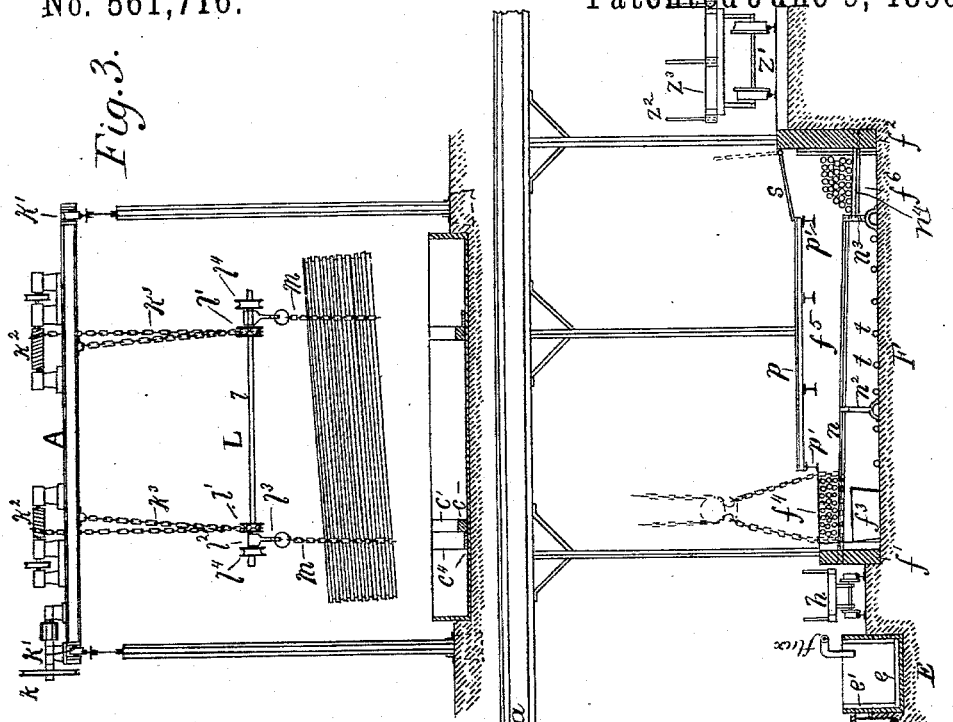
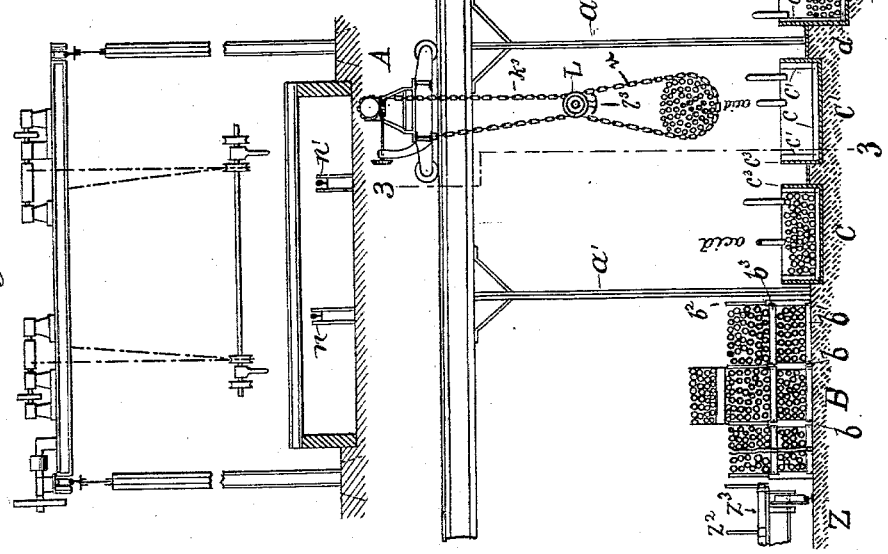
Witnesses.
Chas. J. Farrar.
Robert C. Totten
Inventor.
Harry B. Lynch
By Stay & Totten
Attorneys.

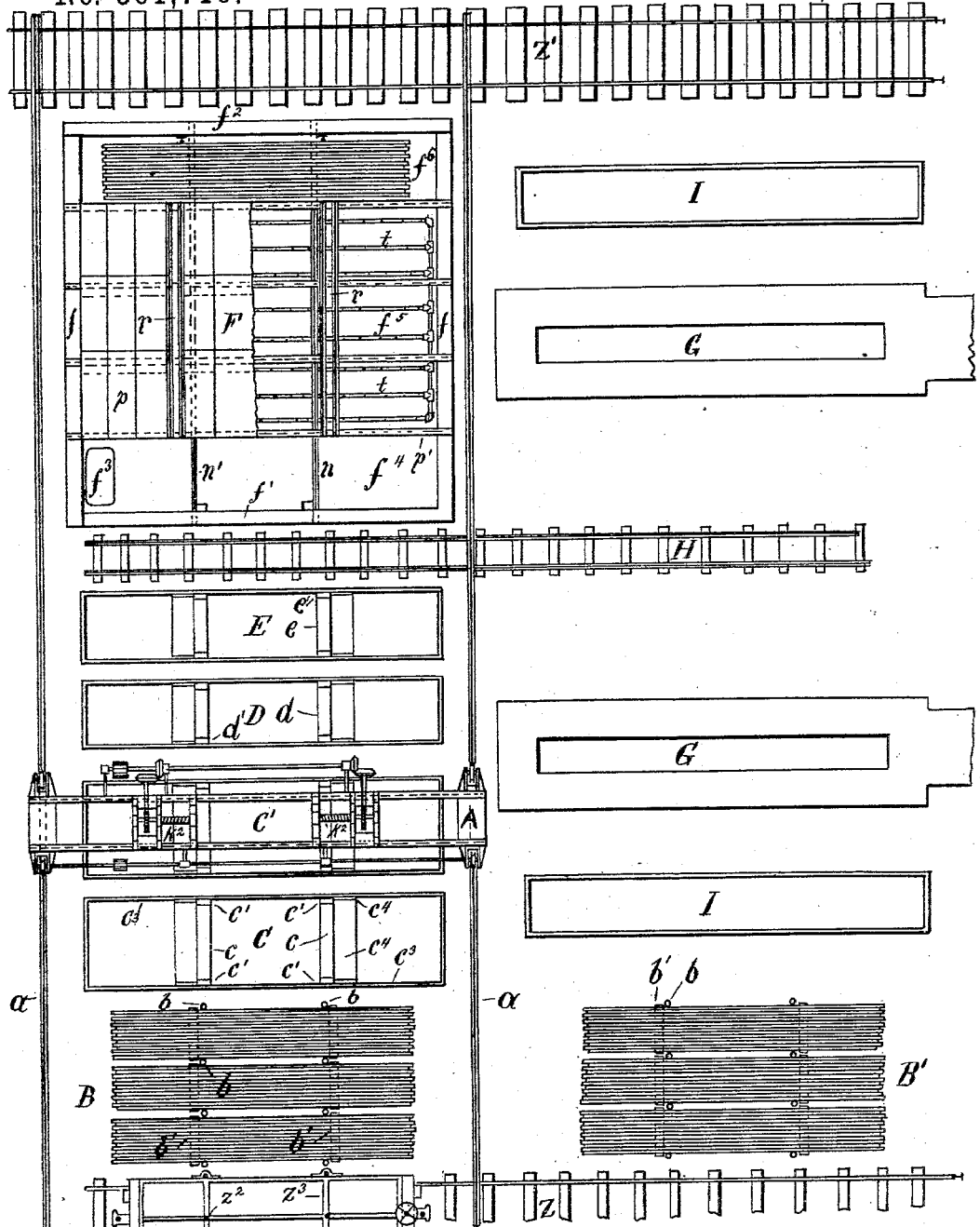

UNITED STATES PATENT OFFICE.

HARRY B. LYNCH, OF McKEESPORT, PENNSYLVANIA, ASSIGNOR TO EDMUND C. CONVERSE, OF NEW YORK, N. Y.

METHOD OF AND APPARATUS FOR PREPARING PIPE OR BAR FOR COATING WITH METAL.

SPECIFICATION forming part of Letters Patent No. 561,716, dated June 9, 1896.

Application filed April 8, 1895. Serial No. 544,932. (No model.)

*To all whom it may concern:*

Be it known that I, HARRY B. LYNCH, a resident of McKeesport, in the county of Allegheny and State of Pennsylvania, have invented a new and useful Improvement in Methods of and Apparatus for Preparing Pipe or Bar for Coating with Metal; and I do hereby declare the following to be a full, clear, and exact description thereof.

My invention relates to the preparing of pipes and bars for coating with metal, such as the pickling or treating of the same with sulfuric acid to remove the scale or oxid, and the subsequent steps to prepare the pipe or bar before it is immersed in the coating-bath. This operation has heretofore been performed by hand, each separate pipe or a couple at a time being fed to the bath and the pipes being lifted out by hooks and taken from bath to bath by hand, one of the principal items of cost in the coating of such pipe or bar being the labor incident to the work of preparing pipe by pickling, washing, &c., while the work was dangerous, often injuring the workmen by the acid of the bath and sometimes leading to more serious accidents around the acid-tanks.

The object of the present invention is to provide for the handling of the pipe entirely by machinery as it is carried from bath to bath and for the rapid handling of the same in large bodies, as well as to more evenly and thoroughly treat the pipe and effect a large saving in labor.

In practicing my invention I carry the pipe or bar in bulk transversely of their length from the storage-floor and insert them in bulk in the acid or pickling bath and agitate them in bulk in the course of the pickling, carry them in bulk transversely of the pipe to the washing and fluxing tanks and to the drying-oven, pass them transversely in layers through the drying-oven, and gather them again into bulk form and carry them to the coating-pot, it being found that in this way the pipes can be rapidly and expeditiously handled and more perfectly cleaned and dried, the time required being reduced about one-half, while the work is performed by about one-third the number of workmen.

My invention consists in the above general method and in certain steps of the said method, as will be hereinafter described and claimed, as well as certain improvements in the apparatus.

To enable others skilled in the art to practice my invention, I will describe the same more fully, referring to the accompanying drawings, in which—

Figure 1 is a longitudinal section of apparatus suitable for practicing the invention. Fig. 2 is a plan view; and Fig. 3 is a cross-section on the line 3 3, Fig. 1. Fig. 4 is a cross-section of the drying-oven.

Like letters of reference indicate like parts in each figure.

The invention will be described in connection with the apparatus illustrated in the accompanying drawings, which are found well adapted for the purpose, though it is of course to be understood that changes may be made therein and still be included within the scope of the invention.

Referring now to Fig. 1, which is a longitudinal section through the plant, $a$ is the track for the overhead crane A, which is formed of I-beams having rails on the upper faces thereof, the I-beams themselves being supported on columns $a'$. In the drawings, B is the storage-floor, C C' are the pickling tanks or vats, D is the washing-tank, E is the fluxing or muriatic-acid tank, and F is the drying-oven. At any suitable locality are railroad-tracks for the carrying of the pipe to and shipping from the plant, the drawings showing two such tracks Z Z', one at each end of the plant. In the ideal plant the proper location for the coating-pot G would be at the end of the drying-oven, and it may be so arranged if there is space for the same. As the invention has been employed by me, however, it has been found necessary to place the coating-pot to one side of the cleaning apparatus, on account of lack of space, and to carry the pipe thereto I employ the track H between the fluxing-tank and oven, which extends out in line with the coating-pot. Beyond the coating-pot is the water-tank I employ for dipping the pipe after they are coated. Fig. 2 also shows another such coating-pot and water-tank, and beyond the same a second storage-floor B', which may be employed when necessary, and where the pipe may be stored in the same way as on the storage-floor B.

Having so located the several parts of the plant, I will first describe the different parts, so that the method desired to be practiced can be more clearly understood. For the purpose of handling the pipe in bulk I employ the overhead crane A, which travels on the tracks $a$ and may be of any suitable construction, the crane shown having certain changes in construction suitable for the present invention, which can be made in any other form of crane. The crane shown is a rope-driven crane, power being applied to it through the rope-wheels $k$, with which an endless traveling rope running longitudinally of the track and at one side of the crane engages, power being applied from the same through suitable gear connections, (not necessary to describe,) first, to turn the wheels $k'$ and so move the crane along the track, and, second, to rotate the sheaves $k^2$, from which chains hang to support the depending pipe-carrier L, with which the chains carrying the pipe are to be connected. The pipe-carrier L is hung by means of the chains $k^3$, one end of each chain being connected to the crane-body, and passing thence down around a grooved sprocket-wheel $l'$ rigid on the main shaft $l$ of the pipe-carrier, passing thence upwardly to the sheaves $k^2$, so that as the pipe-carrier L is raised or lowered by the turning of the sheaves it is also rotated. Mounted on the shaft $l$ are the loose sleeves $l^2$, carrying at the lower end thereof the double hooks $l^3$, with which the carrying-chains $m$ engage in the ordinary carrying of the pipe. Beyond these chain-hooks and rigidly secured to the shaft $l$ are the grooved sprocket-wheels $l^4$, which are employed in agitating the pipe in bulk, as hereinafter described. To obtain the necessary strength to sustain the heavy weight handled at one time, which is often in the neighborhood of ten tons, I employ the ordinary very heavy welded chain and form the inner faces of the sprocket-wheels with seats to receive the chains, finding that a preferable construction, as it permits me to use the strong welded chain. This crane is adapted to pass over the cars by which the pipe is carried to and from the plant and over the storage-floor, the treating-tanks, and drying-oven, and it carries the pipe transversely of its length from place to place in the cleaning of the same.

The storage-floor B consists of a series of posts $b$, which extend up, as shown in Fig. 2, about midway between the centers and ends of the pipe and serve to divide the storage-floor into sections, and transverse bars $b'$ extend across the lower part of the floor transversely to the piles of pipe, which serve to support the pipe above the floor. In this way the different piles or bodies of pipe are held between the posts $b$, which form spaces between them, and above the floor for the thickness of the cross-bars $b'$, so that each pile of pipe in this way can be held as a separate body, and when it is desired to place any particular size or body of pipe upon the storage-floor it is first carried from the car, which preferably has similar posts and cross-beams, as at $z^2 z^3$, and lowered in bulk into place on the floor, and when it is desired to treat for coating any particular body of pipe on the storage-floor the chains $m$ are passed around the end of such body, space being left between the different piles by means of the posts $b$, and space to pass the chains under the body of the pipe by means of the cross-beams $b'$, the chains being then carried up and connected to the hooks $l^3$ of the pipe-carrier, so that such body of pipe can be lifted from the floor without interfering with any other body of pipe on the floor. As shown, several different piles of pipe can be arranged one above the other by employing extensions $b^2$ of the pipes $b$ and placing cross-bars $b^3$ on top of one body or pile of pipe to receive the other body, as illustrated. This storage-floor forms the subject-matter of a separate application of even date herewith, Serial No. 544,931.

I have illustrated two pickling-tanks C C', as it is found well to provide at least two in order to work expeditiously. These are the regular wooden tanks, but different from the regular pickling-tanks in the fact that they have the cross-bars $c$ and the vertical side bars $c'$ along their inner faces, which provide for the supporting of the pipe above the bottom of the tank and away from the side walls $c^3$ of the tank, so leaving space around the tank for the withdrawal or insertion of the chains when the pipe are in the tank. It will also be noticed that extending out from these bars $c c'$ at the side and bottom of the tank, but of less thickness, are the protecting-boards $c^4$, which I term the "chain-guards," the function of which is to prevent the wear of the tank at these points where the chains are likely to contact. The water-tank D and fluxing-tank E are of the same general construction as the pickling-tanks, the water-tank having the cross-bars $d$ and the vertical side bars $d'$, and the fluxing-tank having the cross-bars $e$ and vertical side bars $e'$. These several tanks have, of course, suitable supply-pipes for feeding water and acid thereto, and where necessary steam-pipes for heating the same. The tanks, as shown, only require to be slightly over the length of the pipe as the pipe are raised and lowered from the same without moving in the direction of their length, and for this reason smaller tanks in proportion to the amount of pipe treated may be employed. A separate application relating to the pickling of the pipe and to the tank construction, filed of even date herewith, Serial No. 544,930, more fully describes the construction of the apparatus.

The drying-oven F has for its object the proper drying of the muriatic acid or other liquid flux to prepare the pipe for insertion into the galvanizing or other metal-coating bath, and as it also forms the subject-matter of a separate application filed of even date herewith, Serial No. 544,929, detailed description thereof is not considered necessary. The furnace is formed of the side walls $f$, the front end wall $f'$, and rear end wall $f^2$. At the front end of the furnace is the uncovered portion $f^4$, upon which the pipe after treatment in the several baths are lowered, and extending from the same is the drying-section $f^5$, which leads down to a collecting-section $f^6$, the pipe being lowered in bulk into the receiving-section $f^4$ and there separated for the first time and passed in layers through the drying-section, and collected together in the collecting-section ready again to be carried in bulk by the chains, so as to be taken to the coating-pot. Extending from the front wall $f^2$ at a downward incline through the drying-section $f^5$ are the rails $n\ n'$, the rails $n'$ being lower than the rails $n$, so that as the pipes rest on the receiving-section $f^4$ and as they pass downwardly through the drying-section $f^5$ along the inclined rails the fluxing acid within the mass of pipe can drain therefrom, and for that purpose collecting-tanks $f^3$ are generally employed in the receiving-section $f^4$, into which the acid passing from the interior of the pipes may enter. The rails $n\ n'$ lead down to the collecting-section and are supported at intervals by the standards $n^2\ n^3$, the lower ends being supported in the standards $n^3$, from which rails $n^4$ extend at a point below the rails $n\ n'$ to the rear wall $f^3$, forming the supports for the pipe in the collecting-section $f^6$. Across the top of the oven are suitable I-beams $p'$ to give support to the roof $p$, these I-beams resting on the side walls $f$, as shown in Figs. 1 and 2. The roof $p$ is generally formed of sheet metal, such as corrugated plates, and in order to work the pipe through the drying-oven the slots $r$ are formed in the roof, as shown in Fig. 2, extending longitudinally of the furnace and longitudinally of the course of the pipes through the furnace and giving space for the insertion of any suitable hooks or tools for spreading out the pipes over the supporting-rails $n\ n'$ for the proper drying thereof, the workmen standing on top of the roof for this purpose. Over the collecting-section $f^6$ is the roof $s$, which is hinged to the back wall $f^2$ and is adapted to be raised, as shown in dotted lines, Fig. 1, into such position that after the pipe has been collected in such section of the oven chains can be passed around the same and the pile of pipe can be lifted out of the collecting-section and carried to the car $h$, traveling on the track H, and thence transported to the coating-pot. During the regular drying operations, however, this roof-section $s$ is lowered. Extending under the drying-oven are a series of gas-pipes $t$, in which natural or other gas is burned, so providing the heat for drying the pipe.

In practicing my invention with the apparatus above described the pipe, according to the size desired and as they are found on the storage-floor, are first carried to and inserted in one of the pickling-tanks. To do this, the operator passes the carrying-chains $m$ from the ends of the pile around that particular body of pipe, which in small pipe amounts to, approximately, about ten tons, sliding the chains from the ends toward the center in the spaces provided by the posts $b$ and cross-bars $b'$, and then connecting the chains to the carrying-hooks $l^3$. By means of the power-crane he then lifts up this mass of pipe in bulk and carries it over and lowers it into one of the pickling-tanks. As a strong acid is required for the pickling of the pipe and on account of the weight of the pipe, it is necessary to use wrought-iron chains. The usual custom is to withdraw the chains, so that they will not be subjected to the acid for any great period, and for that purpose I generally hook onto the chains pieces of copper-wire rope, which are drawn under the mass of pipe in the tank and remain there until it is necessary to agitate the pipe or withdraw it from the tank.

It will be noticed in Fig. 3 that the mass of pipe hung from the carrier L of the crane is supported on an incline. This is done so as to always provide for the draining of the pipe when raised out of the tanks, and in addition so that as the pipe are lowered into the tank the water will flow into one end thereof and any air contained therein will be expelled from the interior of the pipe. As a very large mass of pipe are thus inserted at one time into the bath, in order to insure the action of the acid on the entire exterior surfaces of the pipe I find it necessary to agitate the pipes one or more times during the pickling thereof; and this may be accomplished in any suitable way, though the preferred way is to turn the mass of pipe by rotating the bulk of pipe, so as to cause the pipe to roll over on each other, and so expose their surfaces for action of the acid. The way I have shown for accomplishing this is to pass the agitating-chains $u$ under the mass of pipe, hook the ends of the chains together around the sprockets $l^4$ of the pipe-carrier, and when so connected the pipe-carrier is raised by means of the sheaves $k^2$, which wind up the chains $k^3$, passing around the sprockets $l'$. This rotates the pipe-carrier and with it the sprockets $l^4$, which draw upon one side of the agitating-chains $u$ and so carry up one side of the mass of pipe and cause the pipe to roll over each other when held within the agitating-chains, and by raising the mass of pipe one or more times from the pickling-tank and lowering it back into the same the positions of all the pipe in mass are changed so as to insure the action of the acid on the entire outer surface of each pipe. After such agitation the mass of pipe remains in the pickling-bath for a proper period, and when the pickling is completed the carrier-chains are again passed around the pipe and the whole mass or bulk of pipe lifted by means of the crane from the pickling-bath, held above the same a short time for drainage, and then carried transversely of their length to the washing-tank D and lowered into the same, where they remain for a suitable period to provide for the washing off of all the sulfuric acid from the mass, and they are then raised by the crane, permitted to drain, and carried to the fluxing-tank. For the purpose of fluxing I prefer to employ a solution of muriatic acid and water in proper proportions, which prevents the oxidizing of the surfaces of the pipe in the subsequent drying of the same, though any other suitable flux may be employed. After being immersed in the fluxing-bath the mass of pipe is raised therefrom, permitted to drain, and carried over to the drying-oven and lowered into the receiving-section $f^4$ thereof, and the chains are then removed and the pipe passed, either by gravity transversely of their length rolling down the rails $n$ $n'$, or, if they are too small, are drawn down the same end and are spread out in the oven, generally in a single layer over the rails, and exposed in this way layer by layer to the heat of the drying-oven and worked down through the same into the collecting-section $f^6$. As soon as any particular mass is thus dried and collected together the hinged door $s$ is raised, the carrying-chains are then passed around them, and the mass of pipe raised in bulk and carried over to the track H and then carried to the coating-pot G, the pipes being inserted within the coating-pot and withdrawn and inserted in the cooling-tanks I.

Where a building of sufficient length can be provided, it is evident that the coating-pot can be placed beyond the drying-oven and in line therewith, and the pipes inserted as dried, and for that matter, may be taken without the necessity of collecting them again in bulk, the pipes being lifted by the workmen from the collection-section and inserted in the coating-pot as desired.

I find from practical use of the above apparatus that as compared with the former ways of handling pipe for coating, one-third the number of workmen can prepare for coating twice the amount of pipe in the same length of time, and on account of the rapid and proper handling of pipe, both in treating and drying, the pipe can be prepared for coating in about one-half the time. In addition to this, as the entire mass of pipe is inserted in and withdrawn from the bath at the same time, it also receives a like acid treatment and there is no fear of the acid continuing to work on the pipe after it is ready for treatment, as was the case where it was withdrawn pipe by pipe from the bath, which necessitated some of the pipe remaining in the bath much longer than necessary and led to waste of acid and metal and injury to the pipe. Practical experience has shown that the pipe is more evenly cleaned, and that on account of this way of treating it a more uniform and even coating of metal is formed upon the pipe when dipped.

What I claim as my invention, and desire to secure by Letters Patent, is—

1. A method of preparing pipe and bar for coating with metal, consisting in carrying them in bulk transversely of their length from the storage-floor to and inserting them in bulk in the acid-bath, agitating them in bulk in the course of pickling, carrying them in bulk transversely of their length to the washing and fluxing baths and to the drying-oven, passing them transversely in layers through the drying-oven and collecting them again into bulk and carrying them into the coating-pot, substantially as set forth.

2. The step in the method of preparing pipe or bar for coating with metal, consisting in suspending a mass of pipe in supports at each end in bulk and inserting them transversely of their length first into the acid-bath, and then carrying them to and inserting them transversely of their length successively into the washing and fluxing baths, substantially as set forth.

3. The step in the method of preparing pipe and bar for coating with metal, consisting in carrying them in bulk to and inserting them in bulk in the treating-baths and carrying them in bulk to the drying-oven and passing them in layers transversely of their length through the drying-oven, substantially as described.

4. The steps in the method of preparing pipe and bar for coating with metal consisting in carrying them in bulk to and inserting them in bulk in the treating-baths and carrying them to the drying-oven and passing them in layers transversely of their length through the drying-oven, and collecting them again into bulk and carrying them to the coating-pot, substantially as set forth.

5. A plant for preparing pipe or bar for coating with metal, having a pickling-tank and one or more treating-tanks parallel therewith in the direction of their length, a traveling crane supported on tracks above said tanks, and having a vertically-adjustable depending pipe-carrier provided with hooks at the ends thereof and flexible metallic supports adapted to pass around the pipe and engage with the hooks of the carrier and carry the pipe transversely of their length from tank to tank, substantially as set forth.

6. A plant for preparing pipe or bar for coating with metal, having a series of pickling and treating tanks parallel with each other in the direction of their length, and beyond the same a drying-oven having a receiving-section, a covered drying-section, and beyond the same, a collecting-section, and a traveling crane supported on tracks above the tanks and drying-oven, and having a depending pipe-carrier and flexible metallic supports depending therefrom and adapted to pass around the pipe and to carry them transversely of their length from tank to tank and to and from the drying-oven, substantially as set forth.

In testimony whereof I, the said HARRY B. LYNCH, have hereunto set my hand.

HARRY B. LYNCH.

Witnesses:
JAMES I. KAY,
ROBERT C. TOTTEN.